(12) United States Patent
Arbogast

(10) Patent No.: US 7,750,944 B2
(45) Date of Patent: Jul. 6, 2010

(54) METHODS AND APPARATUS FOR CAMERA OPERATION

(75) Inventor: Daniel Arbogast, Corvallis, OR (US)

(73) Assignee: GE Security, Inc., Austin, TX (US)

( * ) Notice: Subject to any disclaimer, the term of this patent is extended or adjusted under 35 U.S.C. 154(b) by 1165 days.

(21) Appl. No.: 11/119,979

(22) Filed: May 2, 2005

(65) Prior Publication Data

US 2006/0244838 A1 Nov. 2, 2006

(51) Int. Cl.
*H04N 5/232* (2006.01)
(52) U.S. Cl. .................. 348/211.7; 348/211.8
(58) Field of Classification Search ............. 348/211.7, 348/211.8, 211.13, 143
See application file for complete search history.

(56) References Cited

U.S. PATENT DOCUMENTS

| | | | |
|---|---|---|---|
| 5,331,413 A | 7/1994 | Diner | |
| 5,457,370 A | 10/1995 | Edwards | |
| 5,517,236 A | 5/1996 | Sergeant et al. | |
| 5,900,925 A | 5/1999 | Navarro | |
| 5,930,740 A | 7/1999 | Mathisen | |
| 6,148,100 A | 11/2000 | Anderson et al. | |
| 6,191,842 B1 | 2/2001 | Navarro | |
| 6,380,972 B1 * | 4/2002 | Suga et al. ............. | 348/211.99 |
| 6,597,389 B2 | 7/2003 | Tanaka et al. | |
| 6,940,544 B2 * | 9/2005 | Shimaoka et al. ........ | 348/211.7 |
| 6,977,678 B1 | 12/2005 | Wada et al. | |
| 7,050,093 B1 * | 5/2006 | Wada et al. ............ | 348/211.99 |
| 7,181,123 B2 | 2/2007 | Rhodes et al. | |
| 7,218,342 B2 * | 5/2007 | Kobayashi et al. ....... | 348/211.8 |
| 2002/0140665 A1 * | 10/2002 | Gordon ...................... | 345/156 |
| 2003/0137589 A1 * | 7/2003 | Miyata .................... | 348/211.7 |
| 2003/0227555 A1 * | 12/2003 | Kobayashi et al. ....... | 348/231.6 |
| 2004/0263476 A1 * | 12/2004 | Lim et al. .................. | 345/157 |
| 2006/0100979 A1 * | 5/2006 | Venturino et al. ............. | 707/1 |

* cited by examiner

*Primary Examiner*—Timothy J Henn
(74) *Attorney, Agent, or Firm*—Armstrong Teasdale LLP

(57) ABSTRACT

Methods and apparatus for a video surveillance system is provided. The video surveillance system includes an input device for generating a movement command, at least one camera configured to receive the movement command, wherein the at least one camera includes a decoder configured to decode the movement command into at least one of a pan command, a tilt command, and a camera control command, a menu code segment programmed to control a menu cursor using at least one of the received pan, tilt, and camera control commands, and a memory configured to store camera configuration parameters received from the menu, and a monitor configured to display at least one of an image generated by the at least one camera and a menu display generated by the at least one camera.

22 Claims, 3 Drawing Sheets

METHODS AND APPARATUS FOR CAMERA OPERATION

BACKGROUND OF THE INVENTION

This invention relates generally to video surveillance systems and, more particularly, to controlling cameras used in a video surveillance system.

Personal computers (PC) typically use a point-and-click input device, such as a mouse or trackball as a standard method for entering data and for navigating throughout computer programs and menus within those programs. At least some known video surveillance systems utilize complex and detailed menus for initializing and programming the PTZ cameras. Creating the menus using input features, such as buttons, drop-down list boxes, text fields, check boxes, that have become commonplace when operating PCs, facilitates interaction with the menus. Such input features also enable quicker and more understandable menu navigation for the user, thus increasing the ease of use of the surveillance system.

At least some known modern video surveillance systems utilize controller keypads that have built-in joysticks for camera pan and tilt control and a switch to control various functions of the camera, for example, an iris control, a focus control, and a zoom control. The joystick and camera control switches control signal, which are transmitted to a decoder in the camera. The actual content of the control signal generated by the controller keypad may vary from manufacturer to manufacturer and may vary within different products offered by the same manufacturer depending on configuration and/or specific equipment used. The common content of these signals is the information to control camera panning (left/right), tilting (up/down), and zooming (in/out) regardless of the specific content of the signal. However, menu driven initialization and programming of PTZ cameras may be hampered by different protocols used by each manufacturer or each product line.

BRIEF DESCRIPTION OF THE INVENTION

In one embodiment, a video surveillance system is provided. The video surveillance system includes an input device for generating a movement command, at least one camera configured to receive the movement command, wherein the at least one camera includes a decoder configured to decode the movement command into at least one of a pan command, a tilt command, and a camera control command, a menu code segment programmed to control a menu cursor using at least one of the received pan, tilt, and camera control commands, and a memory configured to store camera configuration parameters received from the menu, and a monitor configured to display at least one of an image generated by the at least one camera and a menu display generated by the at least one camera.

In another embodiment, a computer readable medium encoded with a program code segment executable by a processor for controlling the operation of at least one camera is provided. The code segment is programmed to instruct the processor to receive a first movement command, decode the first movement command into at least one of a pan command, a tilt command, and a camera control command, receive a configuration command, and navigate a menu using a second movement command.

In yet another embodiment, a method of operating a video surveillance system that includes at least one camera configured to receive a movement command from a controller is provided. The camera includes a configuration menu. The method includes decoding the movement command from the controller into at least one of a pan command, a tilt command, and a camera control command, selecting the at least one camera for configuration, and decoding a movement command from the controller into commands for navigating a camera configuration menu.

DETAILED DESCRIPTION OF THE INVENTION

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Figure 1:
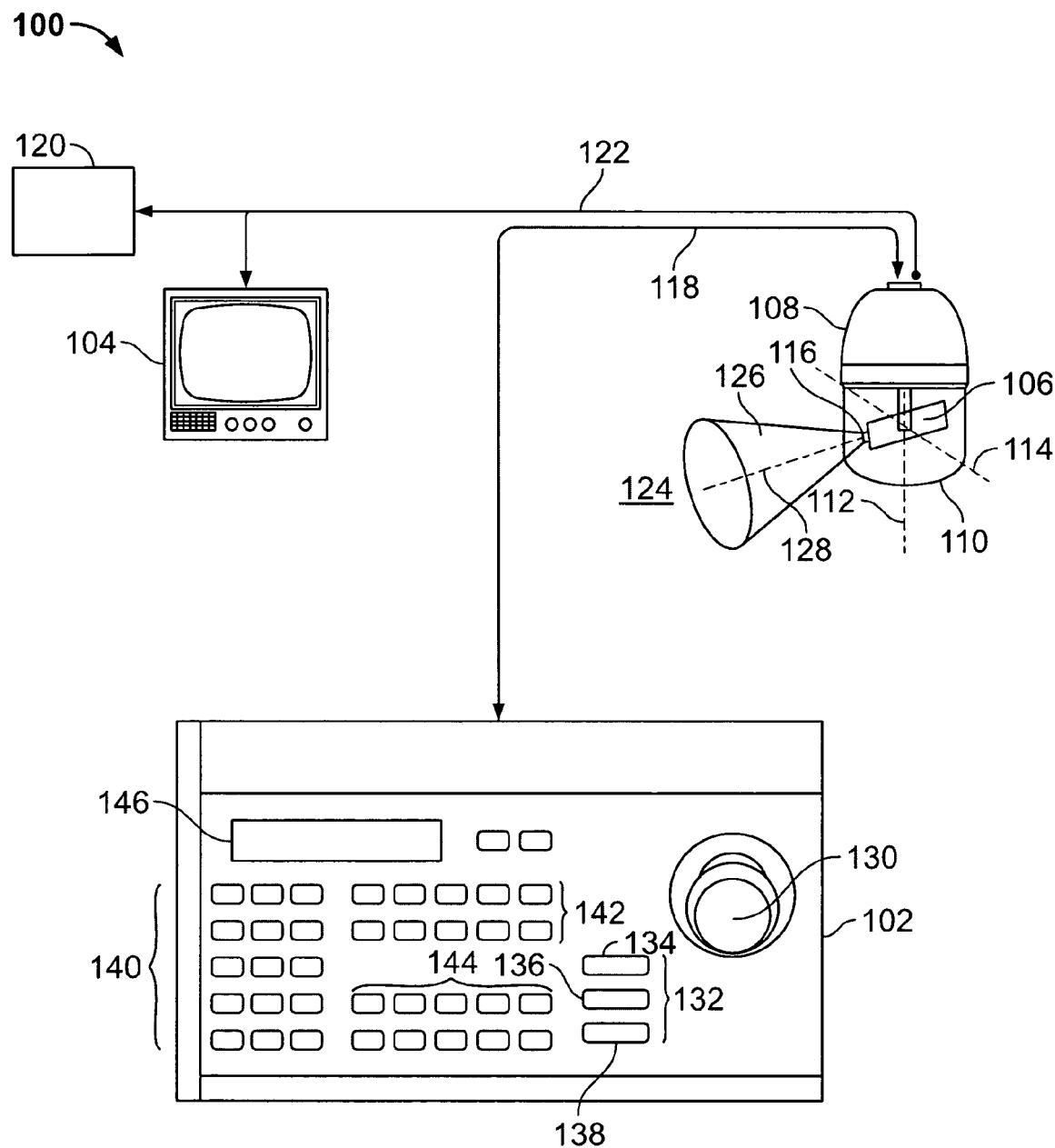
FIG. 1 is a schematic view of an exemplary video surveillance system in accordance with an embodiment of the present invention.

FIG. 1 is a schematic view of an exemplary video surveillance system 100 in accordance with an embodiment of the present invention. Video surveillance system 100 includes a control panel 102, a display monitor 104, and a pan, tilt, and zoom (PTZ) video camera 106. Typically, camera 106 is housed in an enclosure 108 having a dome 110 for protecting camera 106 from the environment where camera 106 may be located. Camera 106 may include capabilities to pan about a vertical axis 112, tilt about a horizontal axis 114, and control a lens assembly 116 to cause camera 106 to zoom, focus, and vary the amount of light entering the camera (iris control). In the exemplary embodiment, signals representing commands to control such capabilities are transmitted from control panel 102 through a control data line 118. Image data signals are transmitted from camera 106 to display monitor 104 and a storage device 120 through a video data line 122. In an alternative embodiment, signals representing commands and image data signals are transmitted concurrently through a single digital data/control line (not shown).

Lens assembly 116 views an area of a location 124, which may be remote from control panel 102 and is in a field of view 126 and along a viewing axis 128 of lens assembly 116. Images of location 124 are converted by camera 106 into an electrical video signal, which is transmitted to display monitor 104.

In the exemplary embodiment, control panel 102 includes an X-Y control joystick 130 that is used to generate pan and tilt commands. A plurality of rocker-type switches 132 are used to control a zoom 134, a focus 136, and an iris 138 of lens assembly 116. In an alternative embodiment, one or more camera control functions may be incorporated into joystick 130. For example, zoom 134, a focus 136, and an iris 138 may be incorporated via buttons, triggers, or twist motions into joystick 130. Control panel 102 also includes a numeric keypad 140 for entering numbers and values. In an alternative embodiment, control panel 102 may include an alpha or alphanumeric keypad (not shown) for entering text as well as numbers. Control panel 102 further includes a plurality of preset switches 142 that may be programmed to execute macros that automatically control the actions of camera 106 and/or lens assembly 116. A plurality of buttons 144 may be used, for example, for predetermined control functions and/or user-defined functions, for example, a camera selection in a multi-camera video surveillance system. A display may be used to display a status of video surveillance system 100 or may be used to display parameters associated with a selected camera.

Figure 2:
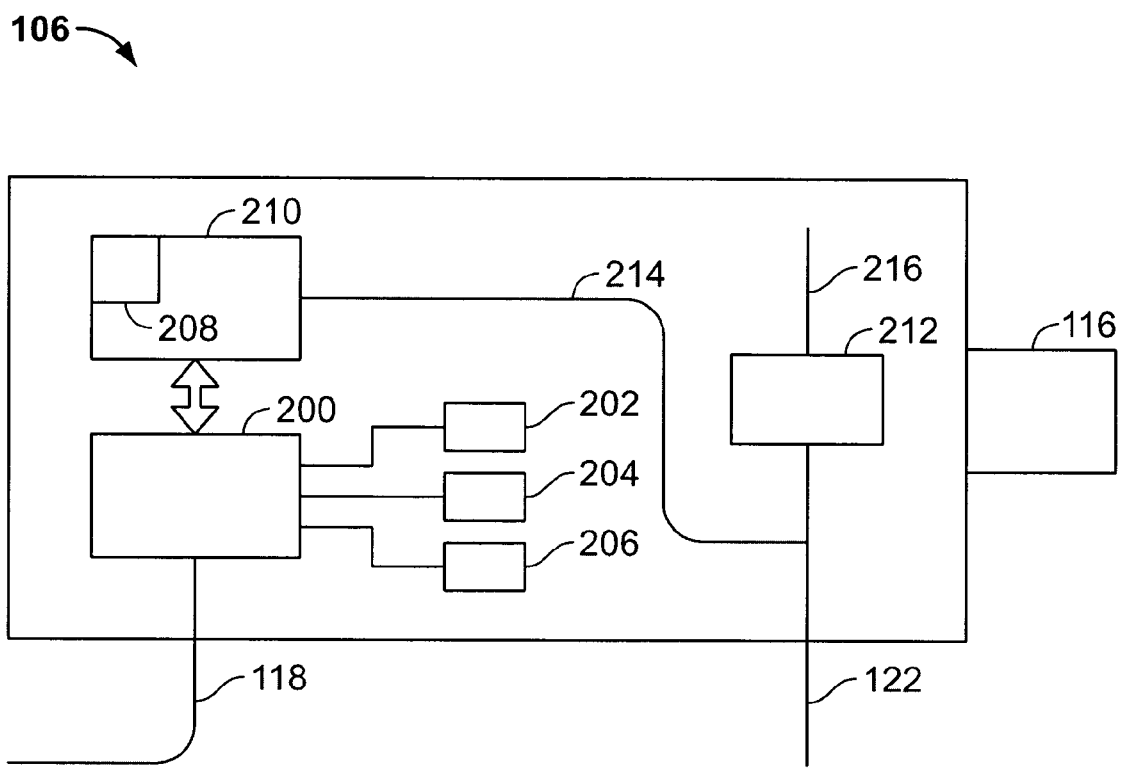
FIG. 2 is a schematic block diagram of an exemplary embodiment of the camera shown in FIG. 1.

FIG. 2 is a schematic block diagram of an exemplary embodiment of camera 106 (shown in FIG. 1). In the exemplary embodiment, camera 106 includes a decoder module 200 that receives commands from control panel 102 through control data line 118. Decoder module 200 decodes the commands and transmits the decoded commands to various modules within camera 106. For example, a command may be a movement command that includes commands such as a pan command, a tilt command, and a camera control command. The pan command may be transmitted to a pan motor 202, the tilt command may be transmitted to a tilt motor 204, and the camera control command may be transmitted to a zoom actuator 206, an iris control (not shown), and a focus control (not shown). Other commands, such as a preset command and a configuration command may be decoded to provide commands to initiate actions to be carried out by camera 106. For example, a preset command may be decoded to initiate execution of a macro stored in a memory 208 of a processor 210. The macro may include a series of commands to be executed in a sequence to carry out a predetermined series of camera movements and operations.

An image assembly 212 may convert light received through lens assembly 116 into electrical signals representative of an image of location 124. The electrical signals may be transmitted to monitor 104 or storage device 120 through video data line 122. In the exemplary embodiment, a line 214 may be used to transmit other video signals to monitor 104. For example, processor 210 may be programmed to generate a menu of user selectable options for display on monitor 104. When the menu is active, video signals from image assembly may be prevented from being transmitted through video data line 122, for example, by removing a signal from a video output enable input 216 of image assembly 212. Alternatively, when the menu is active, the video signals from image assembly 212 may be formatted such that the image represented by the video signals covers only a portion of a screen area of monitor 104.

Processor 210 receives programmed instructions, from software or firmware, and data from memory 208 and performs various operations using the data and instructions. Processor 210 may include an arithmetic logic unit (ALU) that performs arithmetic and logical operations and a control unit that extracts instructions from memory 208 and decodes and executes them, calling on the ALU when necessary. Memory 208 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). In addition, memory 208 may include an operating system, which executes on processor 210. The operating system performs basic tasks that include recognizing input, sending output to output devices, keeping track of files and directories and controlling various peripheral devices.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Memory 208 may include storage locations for the preset macro instructions that may be accessible using one of the plurality of preset switches 142.

As used herein, the terms "software" and "firmware" are interchangeable, and include any computer program stored in memory for execution by processor 210, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
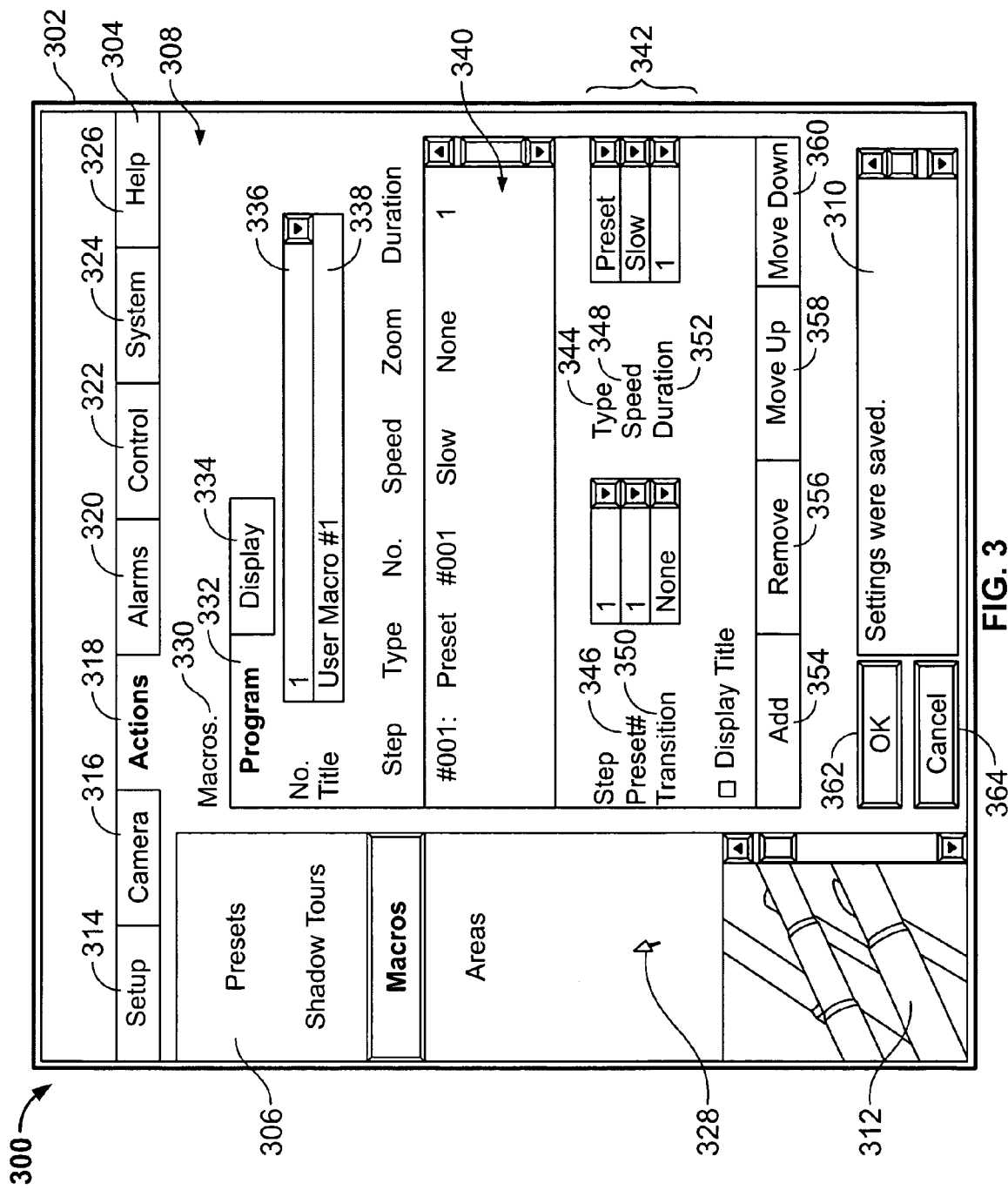
FIG. 3 is a screen shot of an exemplary menu that may be used with camera shown in FIG. 1.

FIG. 3 is a screen shot of an exemplary menu 300 that may be used with camera 106 (shown in FIG. 1). In the exemplary embodiment, menu 300 is a graphical user interface (GUI). In various alternative embodiments, menu 300 is a menu display other than a GUI. Menu 300 includes a title bar 302, a menu bar 304, a menu frame 306, a macro menu select area 308, a status display 310, and may include a camera image monitor area 312. Menu options, such as setup 314, camera 316, actions 318, alarms 320, control 322, system 324, and help 326 may be selected from menu bar 304 using a cursor 328. In the exemplary embodiment, cursor 328 is moved with respect to menu 300 using joystick 130. Pushing joystick in any direction with respect to control panel 102 causes a corresponding movement of cursor 328 with respect to menu 300. To make selections in the various menu options display on menu 300, zoom switch 134, focus switch 136, iris switch 138, or other control switch may be actuated to generate a right mouse click and/or a left mouse click. This method allows control of cursor 328 using the familiar PC mouse control scheme.

In the exemplary embodiment, macro menu select area 308 is used to program macros and enter camera, alarms, control, and system configuration parameters. A macro 330 may be selected, for example, programming 332 or display 334. A macro serial number may be selected through an identifier dropdown list box 336. A title for the selected macro may be displayed in a title box 338. A step 340 of macro 330 may be set using a plurality of drop down list boxes 342 to define a step type 344, a preset number 346, a speed of action 348, a transition 350, and a duration 352. A new step may be added to macro 330 using an add button 354. A step 340 may be removed from macro 330 using a remove button 356. Each step 340 may be moved up in order in macro 330 using moveup button 358 or moved down in order using movedown button 360. Programming of macro 330 may be accepted by selecting an OK button 362. Programming of macro 330 may be canceled by selecting a cancel button 364.

During operation, manipulation of joystick 130 generates movement commands, such as pan and tilt commands, which are encoded and transmitted to camera 106. Manipulation of switches 134, 136, and 138 also generates commands, which are encoded and transmitted to camera 106. The commands are decoded at camera 106 and camera 106 is commanded to pan and tilt in accordance with the decoded commands. For example, zoom switch 134 sends a command to cause lens assembly to zoom in and zoom out. A configuration command may be generated at control panel 102 using a predetermined button or switch, such as a preset button, or a combination of buttons. The configuration command may be decoded in camera 106 to initiate execution of a software code segment in camera 106 that displays a menu on monitor 104, decodes movement commands into a menu cursor movement command and decodes another predetermined command, for example, the zoom command into right and left mouse click commands for menu selection. Configuration parameters entered using menu 300 may be stored in a memory associated with and/or accessible to camera 106. Such configuration parameters may be used by camera 106 and/or control panel 102 to control the operation of camera 106 and control panel 102.

Although the embodiments described herein are discussed with respect to a video surveillance system, it is understood that the alternate menu cursor and input control described herein may be used with other systems controlling electrical equipment.

It will be appreciated that the use of first and second or other similar nomenclature for denoting similar items is not intended to specify or imply any particular order unless otherwise stated.

The above-described embodiments of a video surveillance system provide a cost-effective and reliable means for controlling video cameras using an on board interface that permits a wide variety of control protocols to be used without programming, software patches, and hardware interfaces. More specifically, using commands that are normally generated by the control panel to operate the camera to navigate a menu for configuring the camera facilitates programming the camera and providing configuration parameters in a cost-effective and reliable manner.

Exemplary embodiments of video surveillance systems and apparatus are described above in detail. The video surveillance system components illustrated are not limited to the specific embodiments described herein, but rather, components of each system may be utilized independently and separately from other components described herein. For example, the video surveillance system components described above may also be used in combination with different video surveillance system components. A technical effect of the various embodiments of the systems and methods described herein include facilitating operation and maintenance of video surveillance system by permitting simple interchangeability and compatibility of cameras with a variety of base video surveillance systems.

While the invention has been described in terms of various specific embodiments, those skilled in the art will recognize that the invention can be practiced with modification within the spirit and scope of the claims.

What is claimed is:

1. A video surveillance system comprising:
   an input device for generating a movement command and a configuration command;
   at least one camera configured to receive the movement command and the configuration command, said at least one camera comprising:
   a decoder configured to decode the movement command into at least one of a pan command, a tilt command, and a camera control command, wherein the decoded movement command directly controls camera operation;
   a processor configured to initiate a menu code segment upon receipt of the configuration command, the menu code segment programmed to display a menu having a menu cursor and to decode a first movement command into a menu cursor movement command and a second movement command into a menu option selection command; and
   a memory configured to store camera configuration parameters received from the menu.

2. A video surveillance system in accordance with claim 1 further comprising a monitor configured to display at least one of an image generated by said at least one camera and a menu display generated by said at least one camera.

3. A video surveillance system in accordance with claim 1 wherein said at least one camera is configured to:
   transmit the image to a monitor; and
   transmit the menu display to said monitor when the configuration command is received by said at least one camera.

4. A video surveillance system in accordance with claim 3 wherein said menu code segment is programmed to:
   display at least one menu option of said menu on said monitor;
   receive said at least one of a pan command, a tilt command, and a camera control command; and
   navigate said menu using said at least one of a pan command, a tilt command, and a camera control command.

5. A video surveillance system in accordance with claim 4 wherein said at least one menu option comprises at least one of a button, a drop-down list box, a text field, and a check box.

6. A video surveillance system in accordance with claim 4 wherein said menu code segment is further programmed to:
   position a cursor on said menu based on said at least one of a pan command, a tilt command, and a camera control command; and
   select a menu option based on another of said at least one of a pan command, a tilt command, and a camera control command.

7. A video surveillance system in accordance with claim 4 wherein said menu code segment is further programmed to:
   generate a cursor left/right movement command upon receipt of the pan command;
   generate a cursor up/down movement command upon receipt of the tilt command; and
   generate the menu option selection command upon receipt of the camera control command.

8. A video surveillance system in accordance with claim 1 wherein said menu code segment is further programmed to receive the camera configuration parameters from a user.

9. A computer program embodied on a computer readable medium, said computer program comprising a code segment that receives at least one movement command from an input device and then:
   decodes said at least one movement command from said input device into at least one of a pan command, a tilt command, and a camera control command, the decoded movement command directly controlling camera operation;
   receives a configuration command;
   decodes said configuration command to initiate execution of a menu code segment of software;
   receives said at least one movement command from said input device; and
   navigates a menu by decoding a first movement command of said at least one movement command into a menu cursor movement command using said menu code segment of software and by decoding a second movement command of said at least one movement command into a menu option selection command using said menu code segment of software.

10. A computer program in accordance with claim 9 wherein said menu code segment is further programmed to instruct a processor to store at least one camera configuration parameter received from said menu.

11. A computer program in accordance with claim 9 wherein said at least one movement command is generated by a joystick.

12. A computer program in accordance with claim 10 wherein said code segment is further programmed to instruct said processor to generate a menu cursor movement command using said at least one movement command and said configuration command.

13. A computer program in accordance with claim 10 wherein said code segment is further programmed to instruct said processor to transmit at least one of an image generated by said at least one camera and a menu display generated by said at least one camera to a display monitor.

14. A computer program in accordance with claim 10 wherein said code segment is further programmed to instruct said processor to transmit said menu display to said monitor when said configuration command is received by said camera.

15. A computer program in accordance with claim 9 wherein said menu comprises at least one of a button, a drop-down list box, a text field, and a check box.

16. A computer program in accordance with claim 10 wherein said code segment is further programmed to instruct said processor to:
  position a cursor on said menu using said at least one of a pan command, a tilt command, and a camera control command decoded from said at least one movement command; and
  select a menu option using another of said at least one of a pan command, a tilt command, and a camera control command.

17. A computer program in accordance with claim 10 wherein said code segment is further programmed to instruct said processor to:
  generate a cursor left/right movement command using said pan command;
  generate a cursor up/down movement command using said tilt command; and
  generate the menu option selection command using said camera control command.

18. A method of operating a video surveillance system that includes at least one camera configured to receive movement commands from a controller, the camera including a configuration menu, said method comprising:
  decoding the movement commands from the controller into at least one of a pan command, a tilt command, and a camera control command for direct control of camera operation;
  selecting the at least one camera for configuration by sending a configuration command to the at least one camera that initiates execution of a menu code segment of software; and
  decoding the movement commands from the controller using the menu code segment of software into commands for navigating a camera configuration menu and selecting from menu options.

19. A method in accordance with claim 18 further comprising manipulating a joystick to generate the at least one of a pan, a tilt, and a camera control command.

20. A method in accordance with claim 18 wherein selecting the at least one camera for configuration comprises selecting a programmable preset to initiate configuration.

21. A method in accordance with claim 20 wherein the at least one camera includes a menu code segment, and wherein selecting a programmable preset comprises transmitting a signal to the at least one camera to initiate execution of the menu code segment.

22. A method in accordance with claim 21 wherein decoding a movement command into commands for navigating a configuration menu and selecting from menu options comprises decoding a first movement command into a menu cursor movement command and a second movement command into a mouse click command.

* * * * *